US012650894B2

(12) United States Patent
Chen et al.

(10) Patent No.: US 12,650,894 B2
(45) Date of Patent: Jun. 9, 2026

(54) FIRMWARE DETECTION SYSTEM AND METHOD FOR RECOVERABLE FAULT, STORAGE MEDIUM, AND SERVER

(71) Applicant: Suzhou MetaBrain Intelligent Technology Co., Ltd., Suzhou (CN)

(72) Inventors: Yandong Chen, Suzhou (CN); Daotong Li, Suzhou (CN); Luxiang Wang, Suzhou (CN); Xiuqiang Sun, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/141,136

(22) PCT Filed: Apr. 24, 2024

(86) PCT No.: PCT/CN2024/089627
§ 371 (c)(1),
(2) Date: Jun. 19, 2025

(87) PCT Pub. No.: WO2025/123552
PCT Pub. Date: Jun. 19, 2025

(65) Prior Publication Data
US 2026/0044402 A1     Feb. 12, 2026

(30) Foreign Application Priority Data
Dec. 13, 2023     (CN) ......................... 202311709048.5

(51) Int. Cl.
*G06F 11/00*        (2006.01)
*G06F 11/07*        (2006.01)
(52) U.S. Cl.
CPC ........ *G06F 11/079* (2013.01); *G06F 11/0757* (2013.01); *G06F 11/0772* (2013.01)

(58) Field of Classification Search
CPC ............... G06F 11/079; G06F 11/0757; G06F 11/0772
See application file for complete search history.

(56) References Cited

U.S. PATENT DOCUMENTS 11,226,864 B2 * 1/2022 Liang .................. G06F 11/0772
2012/0272091 A1 10/2012 Sekiguchi et al.
(Continued)

FOREIGN PATENT DOCUMENTS

CN        111414268 A      7/2020
CN        111767184 A      10/2020
(Continued)

OTHER PUBLICATIONS

International Search Report of corresponding PCT application (PCT/CN2024/089627) Jul. 4, 2024, 10 pages.
(Continued)

*Primary Examiner* — Philip Guyton
(74) *Attorney, Agent, or Firm* — COOPER LEGAL GROUP LLC

(57) ABSTRACT
Disclosed are a firmware detection system and method for a recoverable fault, a storage medium, and a server. The method includes: acquiring target fault information stored in a fault register, and transmitting the target fault information to a baseboard management controller (BMC); parsing the target fault information by the BMC, and determining a fault type; controlling, by the BMC, a virtual external device to transmit a target heartbeat request to a server operating system according to a preset transmission period when the fault type of the target fault information is a recoverable fault, and receiving response data fed back by the server operating system and determining, by the BMC, that the server operating system has a crash if detecting that the response data fed back by the operating system is interrupted
(Continued)

within a preset time period, and determining a faulty component in the server according to the target fault information.

20 Claims, 3 Drawing Sheets

(56) References Cited

U.S. PATENT DOCUMENTS

| | | | |
|---|---|---|---|
| 2014/0059389 A1 | 2/2014 | Hattori et al. | |
| 2014/0211637 A1* | 7/2014 | Sawal | G06F 11/0709 370/244 |
| 2018/0157525 A1* | 6/2018 | Song | G06F 13/24 |
| 2020/0050510 A1 | 2/2020 | Chien | |
| 2021/0263868 A1 | 8/2021 | Maddukuri et al. | |
| 2022/0043728 A1* | 2/2022 | Sun | G06F 13/4221 |
| 2025/0103414 A1* | 3/2025 | Krivenok | G06F 11/2092 |

FOREIGN PATENT DOCUMENTS

| | | |
|---|---|---|
| CN | 112463492 A | 3/2021 |
| CN | 113742123 A | 12/2021 |
| CN | 114625600 A | 6/2022 |
| CN | 115033409 A | 9/2022 |
| CN | 116932274 A | 10/2023 |
| CN | 117112273 A | 11/2023 |
| CN | 117389790 A | 1/2024 |
| TW | 201712543 A | 4/2017 |

OTHER PUBLICATIONS

Written Opinion of International Searching Authority of corresponding PCT application (PCT/CN2024/089627) Jul. 4, 2024, 9 pages.
First Office Action of corresponding CN priority application (CN202311709048.5) Jan. 17, 2024, 8 pages.
Notification to Grant Patent Right for Invention of corresponding CN priority application (CN202311709048.5) Jan. 24, 2024, 3 pages.

* cited by examiner

FIRMWARE DETECTION SYSTEM AND METHOD FOR RECOVERABLE FAULT, STORAGE MEDIUM, AND SERVER

CROSS-REFERENCE TO RELATED APPLICATION

The present application claims priority to Chinese Patent Application No. 202311709048.5, filed on Dec. 13, 2023 with the China National Intellectual Property Administration and entitled "Firmware Detection System and Method for Recoverable Fault, Storage Medium, and Server", which is hereby incorporated by reference in its entirety.

FIELD

The present application relates to the technical field of computers, and in particular, to a firmware detection system and method for a recoverable fault, a storage medium, and a server.

BACKGROUND

Servers based on a reliability, availability, and serviceability (RAS) architecture have mature and reliable detection methods for both catastrophic faults and fatal faults. Firmware on the server may monitor a corresponding fault personal identification number (PIN) signal status to determine a fault type of a current server system.

However, even if the server supports corresponding PIN signals to represent the occurrence of a recoverable fault, whether the recoverable fault may cause a crash of a server operating system remains highly uncertain. If the recoverable fault causes the crash but is not detected by the firmware, a failure in fault report may be caused; and if the recoverable fault does not cause the crash, but is reported by the firmware, an error in fault report may occur.

Accordingly, a firmware detection method for a recoverable fault is urgently needed to accurately detect whether the recoverable fault may cause the crash of the operating system, and remind users in time to handle the crash of the operating system when the crash occurs.

SUMMARY

In a first aspect, the present application provides a firmware detection method for a recoverable fault, including:

a basic input/output system (BIOS) acquires target fault information stored in a fault register, and transmits the target fault information to a baseboard management controller (BMC); the BMC parses the target fault information when receiving the target fault information transmitted by the BIOS, and determines a fault type of the target fault information; the BMC controls a virtual external device to transmit a target heartbeat request to a server operating system according to a preset transmission period when the fault type of the target fault information is a recoverable fault, and receives response data fed back by the server operating system based on the target heartbeat request; the BMC determines that the server operating system has a crash if detecting that the response data fed back by the operating system is interrupted within a preset time period after the BMC transmits the target heartbeat request to the server operating system, and determines a faulty component in the server according to the target fault information, where the target fault information is generated when a fault occurs in a server memory and in a peripheral component interconnect express (PCIe) device; and the virtual external device is a universal serial bus (USB) device virtualized by the BMC. Optionally, the fault register includes an uncorrectable error status (UNCERRSTS) register, a device status (DEVSTS) register, and a STATUS register; and the step that BIOS acquires target fault information stored in a fault register includes: the BIOS detects fault information generated in the DEVSTS register, and/or the fault information generated in the STATUS register, and/or the fault information generated in the UNCERRSTS register according to a preset detection period.

Optionally, the target fault information is generated when the fault occurs in the memory; and the step that the BMC parses the target fault information when receiving the target fault information transmitted by the BIOS, and determines a fault type of the target fault information includes: the BMC parses the target fault information, and determines that the fault type of the target fault information is the recoverable fault when a field included in the target fault information satisfies a first preset rule; otherwise, determines that the fault type of the target fault information is an unrecoverable fault.

Optionally, the step that the BMC parses the target fault information, and determines that the fault type of the target fault information is the recoverable fault when a field included in the target fault information satisfies a first preset rule includes: the BMC parses the target fault information, and determines that the fault type of the target fault information is the recoverable fault when the target fault information indicates that the STATUS register records a fault, and the target fault information includes a preset field.

Optionally, the target fault information is generated when the fault occurs in the PCIe device; and the step that the BMC parses the target fault information when receiving the target fault information transmitted by the BIOS, and determines a fault type of the target fault information includes: the BMC parses the target fault information, and determines that the fault type of the target fault information is the recoverable fault when a field included in the target fault information satisfies a second preset rule.

Optionally, when the field included in the target fault information satisfies the second preset rule, the determining that the fault type of the target fault information is the recoverable fault includes: the BMC determines that the fault type of the target fault information is the recoverable fault when the UNCERRSTS register records an unrecoverable fault, and the DEVSTS register records a non-fatal fault.

Optionally, the system also includes a platform controller hub (PCH); and the step that the BMC controls a virtual external device to transmit a target heartbeat request to a server operating system according to a preset transmission period, and receives response data fed back by the server operating system based on the target heartbeat request includes: the BMC controls the virtual external device to transmit the target heartbeat request to the PCH according to the preset transmission period, and receives the response data fed back by the PCH based on the target heartbeat request.

Optionally, the target heartbeat request is an HID_GET_REPORT request constructed by employing a bmRequest field; and the step that the BMC controls the virtual external device to transmit the target heartbeat request to the server operating system according to the preset transmission period includes: the BMC executes an initialization operation, and creates a crash-status detection task process after completing the initialization operation; the initialization operation includes initializing a relevant library function, and configuring a system clock; the BMC executes the crash-status detection task process, calls a USBD_LL_SetupStage function to handle a setup phase of the virtual external device, calls a USBD_LL_DataInStage function to handle an IN phase of the virtual external device, and calls a USBD_LL_DataOutStage function to handle an OUT phase of the virtual external device; the BMC constructs relevant parameters of the HID_GET_REPORT request when determining that the virtual external device is successfully configured; the BMC calls a usb_control_msg function to transmit the HID_GET_REPORT request after completing the construction of the HID_GET_REPORT request; and the BMC calls a USBD_HID_GetReport function in a peripheral interruption handling function to receive the response data fed back by the server operating system based on the target heartbeat request.

Optionally, the step that the BMC determines a faulty component in the server according to the target fault information includes: the BMC parses the target fault information when it is determined that the server operating system has a crash, determines the faulty component, and records a current crash event and the faulty component into a system environment log (SEL) to prompt the user about the diagnosed faulty component.

In a second aspect, the present application further provides a firmware detection system for a recoverable fault, including:

a basic input/output system (BIOS), a server operating system, a fault register configured in a central processing unit (CPU), a baseboard management controller (BMC), a memory, and a peripheral component interconnect express (PCIe) (a high-speed serial computer expansion bus standard) device, where the BIOS is configured to acquire target fault information stored in a fault register, and transmit the target fault information to a baseboard management controller (BMC); the BMC is configured to parse the target fault information when receiving the target fault information transmitted by the BIOS, and determine a fault type of the target fault information; the BMC is also configured to control a virtual external device to transmit a target heartbeat request to a server operating system according to a preset transmission period when the fault type of the target fault information is a recoverable fault, and receive response data fed back by the server operating system based on the target heartbeat request; the BMC is also configured to determine that the server operating system has a crash if detecting that the response data fed back by the operating system is interrupted within a preset time period after the BMC transmits the target heartbeat request to the server operating system, and determine a faulty component in the server according to the target fault information, where the target fault information is generated when a fault occurs in a server memory and in a peripheral component interconnect express (PCIe) device; and the virtual external device is a universal serial bus (USB) device virtualized by the BMC.

Optionally, the fault register includes an uncorrectable error status (UNCERRSTS) register, a device status (DEVSTS) register, and a STATUS register; and the BIOS is configured to detect fault information generated in the DEVSTS register, and/or the fault information generated in the STATUS register, and/or the fault information generated in the UNCERRSTS register according to a preset detection period.

Optionally, the target fault information is generated when the fault occurs in the memory; and the BMC is configured to parse the target fault information, and determine that the fault type of the target fault information is a recoverable fault when a field included in the target fault information satisfies a first preset rule; otherwise, determine that the fault type of the target fault information is an unrecoverable fault.

Optionally, the BMC is configured to parse the target fault information, and determine that the fault type of the target fault information is a recoverable fault when the target fault information indicates that the STATUS register records a fault, and the target fault information includes a preset field.

Optionally, the target fault information is generated when the fault occurs in the PCIe device; and the BMC is configured to parse the target fault information, and determine that the fault type of the target fault information is a recoverable fault when a field included in the target fault information satisfies a second preset rule.

Optionally, the BMC is configured to determine that the fault type of the target fault information is a recoverable fault when the target fault information indicates that the UNCERRSTS register records an unrecoverable fault, and the DEVSTS register records a non-fatal fault.

Optionally, the system also includes a platform controller hub (PCH); the BMC is configured to control the virtual external device to transmit the target heartbeat request to the PCH according to the preset transmission period, and receive the response data fed back by the PCH based on the target heartbeat request.

Optionally, the target heartbeat request is an HID_GET_REPORT request constructed by employing a bmRequest field; the BMC is also configured to execute an initialization operation, and creates a crash-status detection task process after completing the initialization operation; the initialization operation includes initializing a relevant library function and configuring a system clock; the BMC is also configured to execute e the crash-status detection task process, call a USBD_LL_SetupStage function to handle a setup phase of the virtual external device, call a USBD_LL_DataInStage function to handle an IN phase of the virtual external device, and call a USBD_LL_DataOutStage function to handle an OUT phase of the virtual external device; the BMC is also configured to construct relevant parameters of the HID_GET_REPORT request when determining that the virtual external device is successfully configured; the BMC is also configured to call a usb_control_msg function to transmit the HID_GET_REPORT request after completing the construction of the HID_GET_REPORT request; and the BMC is also configured to call a USBD_HID_GetReport function in a peripheral interruption handling function to receive the response data fed back by the server operating system based on the target heartbeat request.

Optionally, the BMC is configured to parse the target fault information when determining that the server operating system has a crash, determine the faulty component, and record a current crash event and the faulty component into a system environment log (SEL) to prompt the user about the diagnosed faulty component.

In a third aspect, the present application further provides a computer-readable instruction product, including computer-readable instructions, where the computer-readable instructions, when executed by a processor, implement the steps of any aforementioned firmware detection method for the recoverable fault.

In a fourth aspect, the present application further provides a server, which has any firmware detection system for the recoverable fault in the aforementioned second aspect provided therein.

In a fifth aspect, the present application further provides a non-volatile computer-readable storage medium, which has computer-readable instructions stored therein, where the computer-readable instructions, when executed by a processor, implement the steps of any firmware detection method for the recoverable fault in the aforementioned first aspect.

BRIEF DESCRIPTION OF THE DRAWINGS

To describe technical solutions of the present application or in the related art more clearly, the accompanying drawings required in the descriptions of embodiments or the related art are introduced briefly below. Apparently, the accompanying drawings in the following description show some embodiments of the present application, and an ordinary skilled in the art may still derive other accompanying drawings from these accompanying drawings without creative efforts.

DETAILED DESCRIPTION

Figure 1:
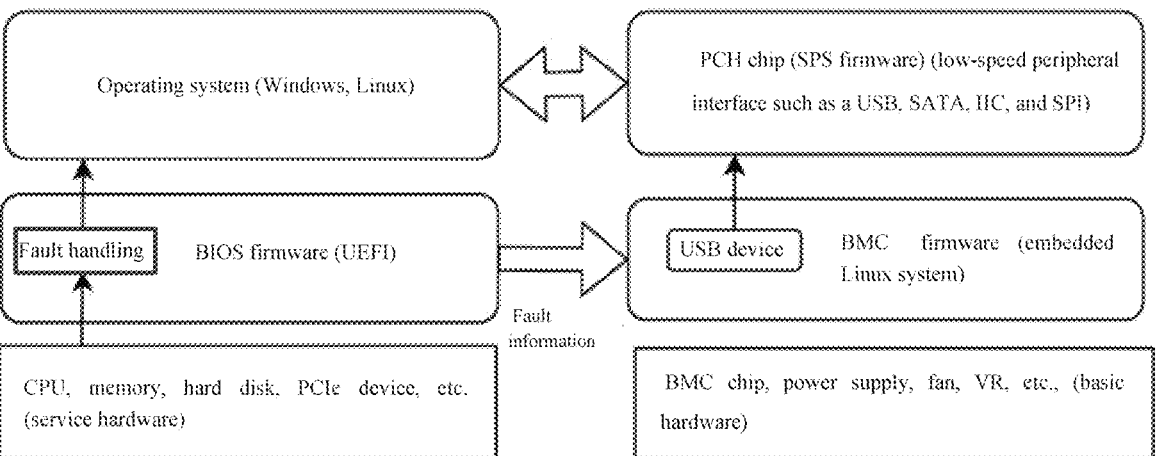
FIG. 1 is a schematic structural diagram of a firmware detection system for a recoverable fault provided in one or more embodiments of the present application.

To make the purposes, technical solutions and advantages of the present application clearer, technical solutions in the present application are described clearly and completely in conjunction with the accompanying drawings in the present application. Apparently, the described embodiments are some embodiments of the present application, not all embodiments. Based on the embodiments of the present application, all other embodiments obtained by an ordinary skilled in the art without creative efforts shall fall within the protection scope of the present application.

In the specification and claims of the present application, terms "first", "second", and the like are intended to distinguish similar objects rather than indicating a specific order or sequence. It should be understood that data used in this way is interchangeable where appropriate, whereby the embodiments of the present application may be implemented in an order other than those illustrated or described here. Moreover, objects distinguished by "first" and "second" are usually of a same kind, and the number of objects is not limited. For example, a first object may be one or more. In addition, "and/or" in the specification and claims indicates at least one of connected objects, and the character "/" generally indicates that contextual objects are in an "or" relationship.

The following describes the technical terms involved in the embodiments of the present application:

RAS is an abbreviation of reliability, availability, and serviceability and is a requirement that a server may be used reliably. An RAS architecture refers to a system architecture designed to meet the requirement. The RAS architecture usually includes the following aspects: reliability: referring to that a system operates continuously as long as possible with minimal downtime. Availability: referring to that the system must can provide an output capability, can be auto-recovered from some mini errors, can isolate the unrecoverable errors as far as possible, and ensure remaining components of the system to operate normally. Serviceability: referring to that the system must provide a hardware detection and report mechanism to notify an administrator to replace hardware in time before a hardware error causes data loss or crash; and provide a hardware error recovery mechanism to correct the errors as far as possible and enable the system to operate continuously and reliably. The RAS architecture is designed to improve the reliability, the availability, and the serviceability of the system, thereby improving the stability and safety of the system.

Basic input/output system (BIOS): the BIOS is an industry standard firmware interface, and the first software loaded when a computer is booted. Actually, the BIOS is a set of programs solidified onto a read-only memory (ROM) chip on a mainboard in the computer; the BIOS stores most essential basic input/output programs, power-on self-check programs, and system self-boot programs of the computer; and the BIOS can read and write system configuration details from a complementary metal oxide semiconductor (CMOS). A primary function of the BIOS is to provide the computer with a bottom and direct hardware configuration and control. Furthermore, the BIOS also provides an operating system with some system parameters.

Baseboard management controller (BMC): the BMC is a core component for deploying, diagnosing, and managing the server. The BMC is responsible for managing an interface between system management software and platform management hardware, and providing autonomous monitoring, event logging, recovery control, and other functions. The BMC may also be configured to acquire information at a hardware level and an operating system level on the server for interactive management, and provide the information to higher-level operation and maintenance network management software.

High-speed serial computer expansion bus standard, i.e., peripheral component interconnect express (PCIe): the PCIe is an interface standard for connecting high-speed components. Each computer mainboard is provided with a plurality of PCIe slots, which may be employed to accommodate a graphics processing unit (GPU), a redundant arrays of independent disks (RAID) card, a wi-fi card or a solid state disk or solid state drive (SSD) expansion card, and the like, and these devices are collectively called PCIe devices.

Platform controller hub (PCH): the PCH is an important component in a mainboard chip set, and is typically located on a lower part of the motherboard, far away from a CPU slot and in front of PCI slots. Primary functions of the PCH include managing a communication between various peripheral devices and the mainboard, such as a PCI bus, a USB, serial advanced technology attachment (SATA), an audio controller, a keyboard controller, a real-time clock controller, and advanced power management (APM); managing computer input/output interfaces such as the USB, audio, and network cards; providing hard disk control, stored data transmission, and other functions through an SATA interface; and managing BIOS chips on the mainboard to ensure the normal boot and operation of the system.

Uncorrectable error status (UNCERRSTS) register: the UNCERRSTS register is configured to record error information of the PCIe bus. If an error occurs on the PCIe bus, such as a data transmission error, a protocol error, or a data check error, the UNCERRSTS register may record a corresponding error flag to facilitate error detection and handling.

Device status (DEVSTS) register: the DEVSTS register is configured to record a CPU status. The DEVSTS register is a register in an Intel x86 architecture and is configured to record device status information. In the Intel x86 architecture, the DEVSTS register is typically configured to record the status information of the device, for example, whether the device is in an interruption status, or whether the device is abnormal. If the DEVSTS register records a fault, it indicates that the device has an error when executing an instruction, which may lead to the system crash or other failures. Further troubleshooting is required to identify root causes, and recovery is implemented.

STATUS register: the STATUS register is configured to record a CPU status, and can record various status information, including interrupt status of the CPU, exception occurrence, carry-over/overflow occurrence, zero-result detection, and negative-result detection. Different CPU architectures may include different STATUS registers, such as RISC-V, an ARM, and x86. The STATUS register may be configured to control a program process, such as performing jumps or branches based on condition codes.

Human interface device (HID): the HID is a standard of a computer device, and is typically configured for human beings to operate and control a computer system. HID devices include keyboards, mice, game-pads, cameras, touch screens, and the like. The HID standard enables these devices to be compatible with any operating system and application program, without additional software or drive programs. The most common HID standard refers to the USB HID specification, which defines a protocol for transmitting data and commands of the HID devices.

bmRequest request: a bmRequest request is a request type in the USB protocol and is configured for transmitting a control command to the USB device. The bmRequest request is typically specified by a bmRequestType field and a bmRequest field in a setup data packet. Where the bmRequestType field specifies the type of the request, such as a request type, a receiver type, and a transmission direction; and the bmRequest field specifies a specific request type, such as acquiring a device descriptor, and setting an end point.

HID_GET_REPORT request: the HID_GET_REPORT request is a request type in the USB protocol and is configured for obtaining a report from the HID devices. The HID devices are human-machine interaction devices, such as keyboards, mice, and game-pads. An HID_GET_REPORT request is typically specified by a report descriptor in an HID descriptor returned by a GET_DESCRIPTOR request. The report descriptor includes information about input, output, and characteristics reports of the HID devices, where the input report is configured for transmitting data to a host, the output report is configured for receiving data from the host, and the characteristics report is configured for reading or setting status information of the device. If the host transmits the HID_GET_REPORT request to the HID device, the HID device may return a specified type of report data.

For the above technical problems in the related art, an embodiment of the present application provides a firmware detection system for a recoverable fault which can perform detection through firmware. As shown in FIG. 1, an embodiment of the present application provides a firmware detection system for a recoverable fault. The system includes a basic input/output system (BIOS), a server operating system, a fault register arranged in a central processing unit (CPU), a baseboard management controller (BMC), a memory, and a peripheral component interconnect express (PCIe) device.

Based on the system shown in FIG. 1, an embodiment of the present application provides a firmware detection method for a recoverable fault, which includes: 1. HID communication detection through a BMC chip: detection of an HID communication with a server operating system is implemented by using a function provided by the BMC chip. 2. Fault handling interruption of the server system: when a recoverable fault occurs in the server system, the BIOS enters fault handling interruption, collects information of the fault register and transmits the information to the BMC. 3. Fault information parsing: after receiving the information of the fault register, the BMC parses a fault type and a faulty component. 4. Crash-status detection task: the BMC initiates a crash-status detection task process, and periodically transmits the bmRequest request via a virtual USB keyboard or mouse device of the BMC chip to the server operating system to detect whether the system responds normally, thereby determining whether the server operating system has a crash.

For example, in the embodiment of the present application, the fault information may be generated when the fault occurs in the memory of the server and in the PCIe device, and data formats of the fault information from different sources are different. For example, the fault type of the memory may be classified into three types: uncorrected no action required (UCNA), software recoverable action required (SRAR), and software recoverable action optional (SRAO).

For example, among the following fault information: the STATUS register of a CPU0 Core17 Bank1, i.e., a data cache unit (DCU) bank records a fault, "Bit(61) UC Valid" represents an unrecoverable fault, and an address resolution of "MCi_ADDR" points to a memory CPU0_Channel2_Dimm1, that is, the address of the memory has a uncorrectable error (UCE) fault; however, because "Bit(56) Signals Valid" and "Bit(55) AR Valid" are set at the same time, it indicates the occurrence of an SRAR-type fault; if the fault is successfully recovered at the operating system level (including discarding the fault address data, closing a program where the fault occurs, etc.), the fault may not lead to the crash; and if the operating system fails to repair, the fault may continue to lead to the crash.

```
"CPU": 0,
    "Core": 17,
    "Module": "Bank1_MC1(DCU)",
    "Register": {
        "MCi_CTL": "0x0000000000000001",
        "MCi_CTL2": "0x0000000540000001",
        "MCi_STATUS": "0xbd80000000100134",
        "MCi_ADDR":    "0x0000000034db8480    Memory:
CPU0_Channel2_Dimm1",
    }
    "Register Decode ": {
        "ErrorType": "SRAR",
        "Mci_Status": [
            "Bit(61)UC Valid", "Bit(56)Signals Valid", "Bit(55)AR Valid"],
    }
```

For example, the recoverable fault of the PCIe device corresponds to a fatal fault, and is typically recorded as a non-fatal fault; in the following fault information, the UNCERRSTS register at the device side records an uncorrectable fault (a completion timeout error) representing a data transmission timeout fault; however, the DEVSTS register at the device side simultaneously records Non-Fatal Error Detected, whereby the device side retransmits the timeout data to a host of the operating system for fault recovery. If the fault fails to be recovered by retransmitting the data, the operating system may further have the crash.

```
"CPU": 0,
    "Module": "PCIe Device",
    "Location": "0x24:0x0:0x0 CPU0_PE1 ",
    "Register": {
        "PCISTS": "0x4010",
        "DEVSTS": "0x000b",
        "UNCERRSTS": "0x00004000",
        "CORERRSTS": "0x00002000",
    }
    "Register Decode": {
        "DEVSTS": ["Unsupported request detected(bit3)",
            "Non-Fatal Error detected(bit1)",
            "Correctable Error detected(bit0)"],
        "PCISTS": ["Signaled System Error(bit14)"],
        "UNCERRSTS": ["Completion time out error (bit14)"],
        "CORERRSTS": ["Advisory non-fatal error (bit13)"]
    }
```

For example, since a firmware layer cannot determine whether the recoverable faults in the PCIe device or in the memory are successfully recovered at the operating system level, the firmware detection method for the recoverable fault provided in the embodiment of the present application may be employed to determine whether the operating system has the crash after the recoverable fault occurs.

The firmware detection method for the recoverable fault provided by the embodiment of the present application may be described below in detail through specific embodiments and application scenarios, with reference to the accompanying drawings.

Figure 2:
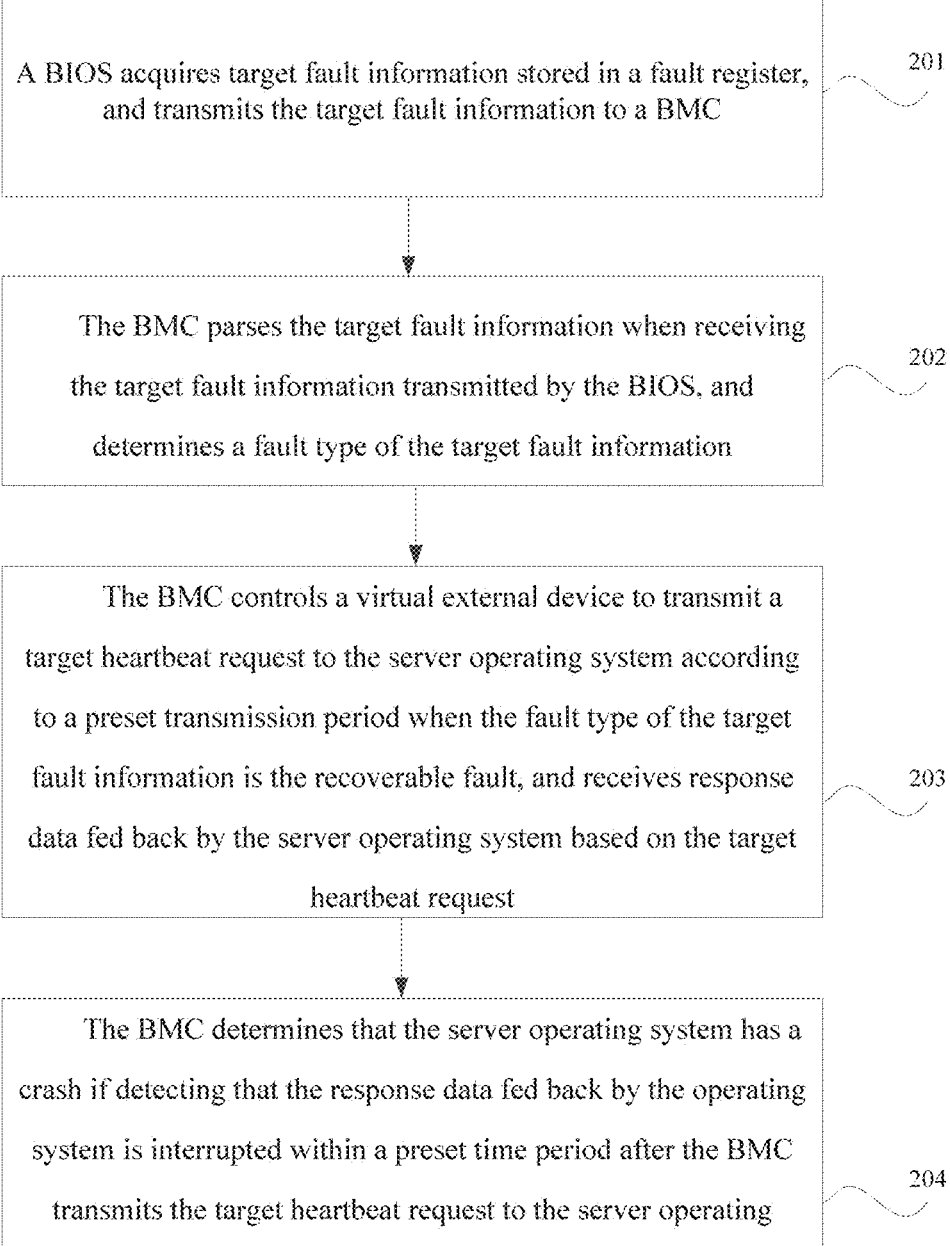
FIG. 2 is a schematic flow chart of a firmware detection method for a recoverable fault provided in one or more embodiments of the present application.

Based on FIG. 1, as shown in FIG. 2, a firmware detection method for a recoverable fault provided by an embodiment of the present application includes a step 201 to a step 204 as follows:

Step 201: A BIOS acquires target fault information stored in a fault register, and transmits the target fault information to a BMC.

The target fault information is generated when a fault occurs in a memory of a server and in a PCIe device.

For example, the fault register may include a UNCERRSTS register, a DEVSTS register, and a STATUS register; and the function of each register is already described in detail in the above description, and is not repeated herein.

For example, after the fault occurs in the memory or in the PCIe device, the fault information may be generated and stored into the fault register. The BIOS may execute fault handling interruption after the fault occurs in the server system, acquires the fault information from the fault register, and transmits the acquired fault information to the BMC, and the BMC parses the fault information.

the step 201 may include a step 201*a* as follows:

Step 201*a*: The BIOS detects the fault information generated in the DEVSTS register, and/or the fault information generated in the STATUS register, and/or the fault information generated in the UNCERRSTS register according to a preset detection period.

For example, the target fault information is acquired by the BIOS from any of the aforementioned three registers. It should be noted that the fault register in the embodiment of the present application may also include another register that can store the fault information.

Step 202: The BMC parses the target fault information when receiving the target fault information transmitted by the BIOS, and determines a fault type of the target fault information.

For example, the BMC parses the target fault information after receiving the target fault information transmitted by the BIOS, and determines the fault type of the target fault information.

, in a case that the target fault information is generated when the fault occurs in the memory, the step 202 may include a step 202*a*:

Step 202*a*: The BMC parses the target fault information, and determines that the fault type of the target fault information is a recoverable fault when a field included in the target fault information satisfies a first preset rule; otherwise, determines that the fault type of the target fault information is an unrecoverable fault.

For example, the first preset rule is configured for determining whether the fault type of the target fault information is a recoverable fault in a case that the target fault information is generated when the fault occurs in the memory.

, the step 202*a* may further include a step 202*a*1:

Step 202*a*1: The BMC parses the target fault information, and determines that the fault type of the target fault information is the recoverable fault when the target fault information indicates that the STATUS register records a fault, and the target fault information includes a preset field.

For example, the preset field in the step 202*a1* may be the "Bit(56) Signals Valid" and "Bit(55) AR Valid" fields in the foregoing embodiments.

It may be understood that as can be seen from the determination for the fault information in the foregoing examples, when the fault information records the field belonging to the unrecoverable fault, it does not indicate that the fault type of the fault information is the unrecoverable fault, and the fault type of the fault information needs to be comprehensively determined according to other fields recorded in the fault information.

, in a case that the target fault information is generated when the fault occurs in the PCIe device, the step 202 may further include a step 202*b* as follows:

Step 202*b*: The BMC parses the target fault information, and determines that the fault type of the target fault information is the recoverable fault when a field included in the target fault information satisfies a second preset rule.

For example, similar to the first preset rule, the second preset rule is configured for determining whether the fault type of the target fault information is the recoverable fault in a case that the target fault information is generated when the fault occurs in the PCIe device.

, based on the above description for an example of the recoverable fault occurring in the PCIe device, the step 202*b* may further include a step 202*b*1 as follows:

Step 202*b*1: The BMC determines that the fault type of the target fault information is a recoverable fault when the UNCERRSTS register records an unrecoverable fault, and the DEVSTS register records a non-fatal fault.

Step 203: The BMC controls a virtual external device to transmit a target heartbeat request to the server operating system according to a preset transmission period when the fault type of the target fault information is the recoverable fault, and receives response data fed back by the server operating system based on the target heartbeat request.

The virtual external device is a USB device virtualized by the BMC.

For example, when the BMC determines that the fault type of the target fault information is the recoverable fault, the BMC may initiate a crash-status detection task process to monitor a status of the server operating system.

For example, the aforementioned target heartbeat request is an HID_GET_REPORT request constructed by employing a bmRequest field.

, the step 203 in which the BMC controls a virtual external device to transmit a target heartbeat request to the server operating system according to a preset transmission period may include a step 203_al_ to a step 203_a5_ as follows:

Step 203_a1_: The BMC executes an initialization operation, and creates the crash-status detection task process after completing the initialization operation.

The initialization operation includes: initializing a relevant library function, and configuring a system clock.

Step 203_a2_: The BMC executes the crash-status detection task process, calls a USBD_LL_SetupStage function to handle a setup phase of the virtual external device, calls a USBD_LL_DataInStage function to handle an IN phase of the virtual external device, and calls a USBD_LL_DataOutStage function to handle an OUT phase of the virtual external device.

Step 203_a3_: The BMC constructs relevant parameters of the HID_GET_REPORT request when determining that the virtual external device is successfully configured.

interact with a host. In the control transmission of the HID device, bmRequest is an 8-bit field, and is configured for specifying a transmission type and a request type. The bmRequest is located in a low byte in a bmRequestType field of a USB request. Upper 2 bits of the bmRequest indicate the transmission type, with binary values including 00, 01, and 10. Where 00 indicates standard transmission and is configured for the standard USB request; 01 indicates class transmission and is configured for device class-related requests; and 10 indicates vendor transmission and is configured for specific vendor-related requests. Lower 6 bits of the bmRequest indicate a request type, and a specific value is determined by the transmission type. For the standard transmission and the class transmission, the value of the request type is defined by a USB specification. For the vendor transmission, the value of the request type is defined by a device vendor.

For example, a code for controlling the virtual external device to transmit the target heartbeat request to the server operating system according to the preset transmission period is shown below:

```
int main(void)
{
  HAL_Init( );
    /* Configure system clock, etc., */
    USBD_Init(&USBD_Device, &HID_Desc, 0);
  USBD_RegisterClass(&USBD_Device, USBD_HID_CLASS);
  USBD_Start(&USBD_Device);
  while (1)
  {
      /* Handle a USB event */
      USBD_LL_SetupStage(&USBD_Device);
      USBD_LL_DataInStage(&USBD_Device, 0x00);
      USBD_LL_DataOutStage(&USBD_Device, 0x00);
      /* Transmit an HID_GET_REPORT request */
    if (USBD_Device.dev_state == USBD_STATE_CONFIGURED)
      {
        uint8_t report[64]; // Assume a report length as 64 bytes
          // Construct an HID_GET_REPORT request
          uint8_t  bmRequestType  =   USB_REQ_TYPE_CLASS  |
USB_REQ_RECIPIENT_INTERFACE;
          uint8_t bRequest = HID_GET_REPORT;
          uint16_t wValue = 0;
          uint16 t wIndex = 0;
          uint16_t wLength = sizeof(report);
          uint8_t* data = report;
          // Transmit an HID_GET_REPORT request
          usb_control_msg(&USBD_Device, bmRequestType, bRequest,
wValue, wIndex, data, wLength);
        }
      }
  }
  void USBD_HID_GetReport(uint8_t *report, uint16_t len)
  {
    /* Handle the HID_GET_REPORT request herein */
    /* usb_control_msg function may be used to transmit data to a computer */
  }
  VENDOR_ID and PRODUCT_ID may be replaced with an actual vendor ID and
```

Step 203_a4_: The BMC calls a usb_control_msg function to transmit the HID_GET_REPORT request after completing the construction of the HID_GET_REPORT request.

Step 203_a5_: The BMC calls a USBD_HID_GetReport function in a peripheral interruption handling function to receive the response data fed back by the server operating system based on the target heartbeat request.

For example, the virtual external device is the USB device virtualized by the BMC.

It should be noted that in a USB communication, the HID device employs control transmission to communicate and product ID of the USB device to be operated. This code may transmit the HID_GET_REPORT request to the server operating system by employing the HID bmRequest field to receive a data packet fed back by the server operating system. Whether the server operating system has the crash is determined by monitoring the data packet fed back by the server operating system.

For example, an implementation logic of the above code includes: 1: initializing a USB and HID libraries of a BMC chip, and configuring a system clock, 2: starting a USB device, 3: creating a process, and establishing an infinite loop for handling a USB event, 4: in a process loop, firstly calling a USBD_LL_SetupStage function to handle a setup phase of the USB device, 5: calling a USBD_LL_DataIn-Stage function to handle an IN phase of the USB device, 6: subsequently, calling a USBD_LL_DataOutStage function to handle an OUT phase of the USB device, 7: checking whether a status of the USB device indicates successful configuration, 8: if the USB device is already successfully configured, constructing relevant parameters of the HID_GET_REPORT request, 9: calling a usb_control_msg function to transmit the HID_GET_REPORT request, 10: calling a USBD_HID_GetReport function in a peripheral interruption handling function of a BMC chip to process the data returned by the system, and 11: repeating the above step 4 to step 10, continuously transmitting the HID_GET_REPORT request, and detecting whether the system returns the data.

In a possible embodiment, the system also includes a platform controller hub (PCH). The step 203 may also include a step 203*b*:

Step 203*b*: The BMC controls the virtual external device to transmit the target heartbeat request to the PCH according to the preset transmission period, and receives the response data fed back by the PCH based on the target heartbeat request.

For example, as shown in FIG. 1, the BMC fails to directly communicate with the server operating system, and monitors the status of the server operating system by means of the PCH.

It should be noted that although reboot of the server operating system may indicate that the system has the crash to a certain extent, a trigger source of the system reboot is not only the fatal fault or the recoverable fault that is not successfully recovered, but also a physical trigger of an on-off button, normal reboot command execution of an in-band OS, the BMC receiving an out-of-band reboot command, and other unstable factors; and furthermore, the virtual machine operating system has a phenomenon of staying down and not rebooting after receiving the fault. Therefore, detecting whether the operating system is in a normal operating status by employing a trusted channel is a reliable solution.

Step 204: The BMC determines that the server operating system has a crash if detecting that the response data fed back by the operating system is interrupted within a preset time period after the BMC transmits the target heartbeat request to the server operating system, and determines a faulty component in the server according to the target fault information.

For example, a crash-status detection task may control a virtual USB keyboard or mouse device of the BMC chip to transmit the bmRequest request to the server operating system according to a preset transmission period (such as an interval of 50 ms) to detect whether the system can respond normally. If, within the preset time period (such as 1 min) after the recoverable fault occurs, the server system transitions from responding to the bmRequest to having no response, or if the BMC detects that the server operating system is already rebooted, then it may be accurately determined that the recoverable fault causes a system crash, and may be directly logged into a system event log (SEL) to prompt the user to replace the diagnosed faulty component.

In a possible embodiment, in the step 204, whether the response data fed back by the operating system is interrupted may be determined according to a cumulative number of failures in receiving the response data fed back by the server operating system. When the cumulative number of failures is greater than a preset threshold, it is determined that the response data fed back by the operating system is interrupted.

the step 204 may also include a step 204*a*:

Step 204*a*: The BMC parses the target fault information when determining that the server operating system has a crash, determines the faulty component, and records a current crash event and the faulty component into the SEL to prompt the user about the diagnosed faulty component.

Figure 3:
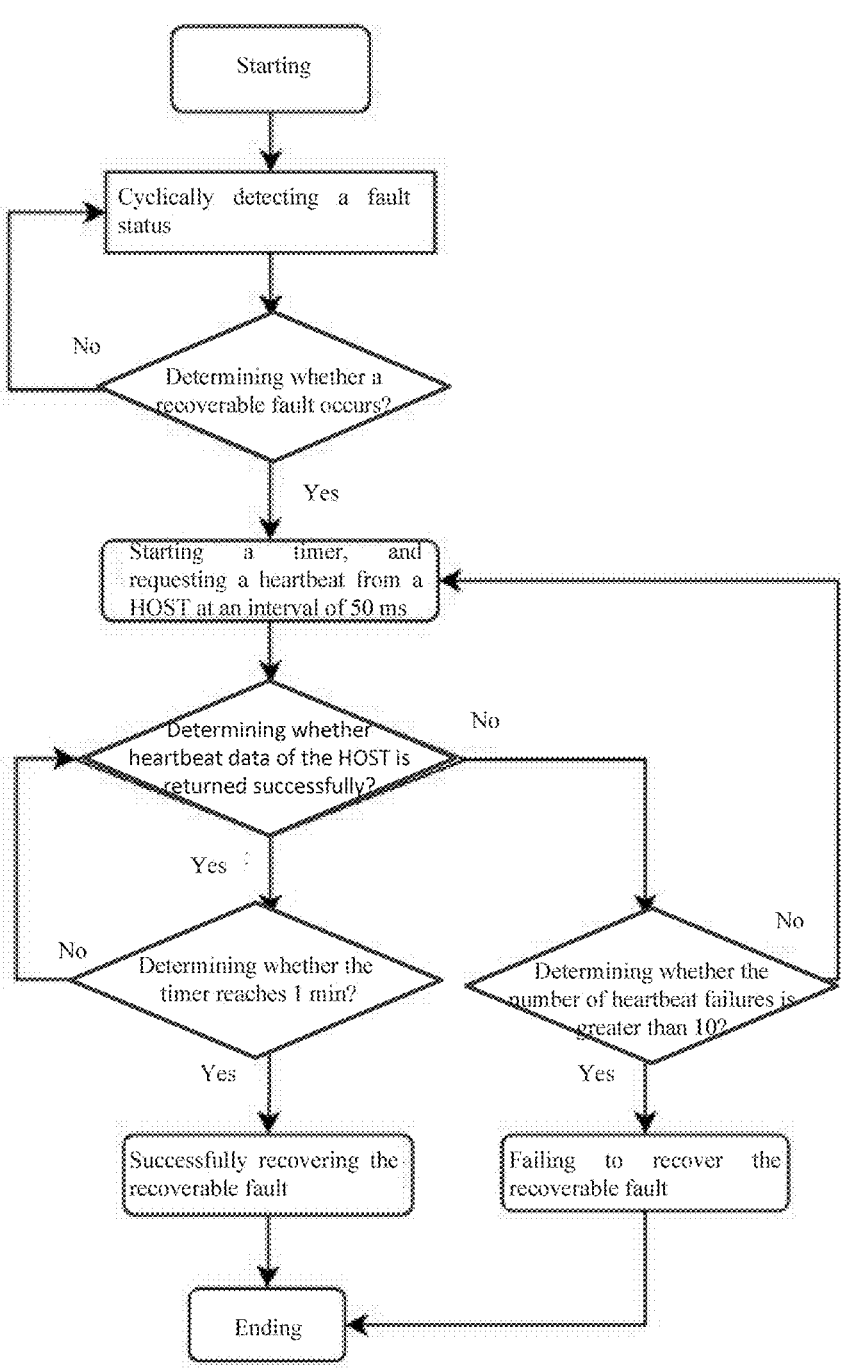
FIG. 3 is a schematic flow chart of a crash-status detection task process provided in one or more embodiments of the present application.

For example, FIG. 3 is a schematic flow chart of a crash-status detection task process provided by an embodiment of the present application. In a case of executing cyclic detection of a fault status, if the recoverable fault is detected, a timer is started, and a heartbeat is requested from a host of the server operating system at an interval of 50 ms, and heartbeat data fed back by the server operating system is received; if the timer reaches 1 min and there is no interruption of the heartbeat data fed back by the server operating system, it may be determined that the recoverable fault is recovered successfully; and if the interruption of the heartbeat data fed back by the server operating system occurs within 1 min, and the cumulative number of heartbeat failures is greater than 10, it may be determined that the recoverable fault fails to recover.

In the firmware detection system for the recoverable fault provided by the embodiment of the present application, firstly, the BIOS acquires target fault information stored in the fault register, and transmits the target fault information to the BMC; the BMC parses the target fault information when receiving the target fault information transmitted by the BIOS, and determines the fault type of the target fault information; secondly, the BMC controls the virtual external device to transmit the target heartbeat request to the server operating system according to the preset transmission period when the fault type of the target fault information is the recoverable fault, and receives the response data fed back by the server operating system based on the target heartbeat request; finally, the BMC determines that the server operating system has the crash if detecting that the response data fed back by the operating system is interrupted within a preset time period after the BMC transmits the target heartbeat request to the server operating system, and determines the faulty component in the server according to the target fault information, where the target fault information is generated when the fault occurs in the memory of the server and in the PCIe device; and the virtual external device is the USB device virtualized by the BMC. Consequently, the recoverable fault causing the crash of the operating system may be accurately detected, and users may be prompted in time to handle the crash of the operating system.

It should be noted that an execution body of the firmware detection method for the recoverable fault provided by the embodiment of the present application may be the firmware detection system for the recoverable fault, or each component in the firmware detection system for the recoverable fault in a firmware detection apparatus for the recoverable fault. In the embodiment of the present application, the firmware detection method for the recoverable fault provided by the embodiment of the present application is explained by taking an example in which the firmware detection method for the recoverable fault is executed by the firmware detection system for the recoverable fault.

It should be noted that in the embodiment of the present application, the aforementioned methods are shown in the accompanying drawings. Each firmware detection method for the recoverable fault is illustrated by taking an accompanying drawing in the embodiment of the present application as an example. In the concrete implementation, the firmware detection method for the recoverable fault shown in each method accompanying drawing may also be implemented in combination with other arbitrary drawings that may be combined as shown in the aforementioned embodiments, and the details are not repeated here.

The firmware detection system for the recoverable fault provided by the present application is described below, and the firmware detection methods for the recoverable fault described below and described above may refer to each other.

FIG. 1 is a schematic structural diagram of a firmware detection system for a recoverable fault. The firmware detection system for the recoverable fault provided in the present embodiment of the present application includes a basic input/output system (BIOS), a server operating system, a fault register configured in a central processing unit (CPU), a baseboard management controller (BMC), a memory, and a peripheral component interconnect express (PCIe) device, where the BIOS is configured to acquire target fault information stored in a fault register, and transmit the target fault information to a baseboard management controller (BMC); the BMC is configured to parse the target fault information when receiving the target fault information transmitted by the BIOS, and determine a fault type of the target fault information; the BMC is also configured to control a virtual external device to transmit a target heartbeat request to a server operating system according to a preset transmission period when the fault type of the target fault information is a recoverable fault, and receive response data fed back by the server operating system based on the target heartbeat request; the BMC is also configured to determine that the server operating system has a crash if detecting that the response data fed back by the operating system is interrupted within a preset time period after the BMC transmits the target heartbeat request to the server operating system, and determine a faulty component in the server according to the target fault information, where the target fault information is generated when a fault occurs in a server memory and in a peripheral component interconnect express (PCIe) device; and the virtual external device is a universal serial bus (USB) device virtualized by the BMC.

Optionally, the fault register includes an uncorrectable error status (UNCERRSTS) register, a device status (DEVSTS) register, and a STATUS register; and the BIOS is configured to detect fault information generated in the DEVSTS register, and/or the fault information generated in the STATUS register, and/or the fault information generated in the UNCERRSTS register according to a preset detection period.

Optionally, the target fault information is generated when the fault occurs in the memory; and the BMC is configured to parse the target fault information, and determine that the fault type of the target fault information is a recoverable fault when a field included in the target fault information satisfies a first preset rule; otherwise, determine that the fault type of the target fault information is an unrecoverable fault.

Optionally, the BMC is configured to parse the target fault information, and determine that the fault type of the target fault information is a recoverable fault when the target fault information indicates that the STATUS register records a fault, and the target fault information includes a preset field.

Optionally, the target fault information is generated when the fault occurs in the PCIe device; and the BMC is configured to parse the target fault information, and determine that the fault type of the target fault information is a recoverable fault when a field included in the target fault information satisfies a second preset rule.

Optionally, the BMC is configured to determine that the fault type of the target fault information is a recoverable fault when the target fault information indicates that the UNCERRSTS register records an unrecoverable fault, and the DEVSTS register records a non-fatal fault.

Optionally, the system also includes a platform controller hub (PCH); the BMC is configured to control the virtual external device to transmit the target heartbeat request to the PCH according to the preset transmission period, and receive the response data fed back by the PCH based on the target heartbeat request.

Optionally, the target heartbeat request is an HID_GET_REPORT request constructed by employing a bmRequest field; the BMC is also configured to execute an initialization operation, and creates a crash-status detection task process after completing the initialization operation; the initialization operation includes initializing a relevant library function and configuring a system clock; the BMC is also configured to execute the crash-status detection task process, call a USBD_LL_SetupStage function to handle a setup phase of the virtual external device, call a USBD_LL_DataInStage function to handle an IN phase of the virtual external device, and call a USBD_LL_DataOutStage function to handle an OUT phase of the virtual external device; the BMC is also configured to construct relevant parameters of the HID_GET_REPORT request when determining that the virtual external device is successfully configured; the BMC is also configured to call a usb_control_msg function to transmit the HID_GET_REPORT request after completing the construction of the HID_GET_REPORT request; and the BMC is also configured to call a USBD_HID_GetReport function in a peripheral interruption handling function to receive the response data fed back by the server operating system based on the target heartbeat request.

Optionally, the BMC is configured to parse the target fault information when determining that the server operating system has a crash, determine the faulty component, and record a current crash event and the faulty component into a SEL to prompt the user about the diagnosed faulty component.

In the firmware detection method for the recoverable fault provided by the present application, firstly, the BIOS acquires target fault information stored in the fault register, and transmits the target fault information to the BMC; the BMC parses the target fault information when receiving the target fault information transmitted by the BIOS, and determines the fault type of the target fault information; secondly, the BMC controls the virtual external device to transmit the target heartbeat request to the server operating system according to the preset transmission period when the fault type of the target fault information is the recoverable fault, and receives the response data fed back by the server operating system based on the target heartbeat request; finally, the BMC determines that the server operating system has the crash if detecting that the response data fed back by the operating system is interrupted within a preset time period after the BMC transmits the target heartbeat request to the server operating system, and determines the faulty component in the server according to the target fault information, where the target fault information is generated when the fault occurs in the memory of the server and in the PCIe device; and the virtual external device is the USB device virtualized by the BMC. Consequently, the recoverable fault causing the crash of the operating system may be accurately detected, and users may be prompted in time to handle the crash of the operating system.

In another aspect, the present application also provides a computer-readable instruction product, where the computer-readable instruction product includes computer-readable instructions stored on a non-volatile computer-readable storage medium, the computer-readable instructions include program instructions, and when the program instructions are executed by a computer, the computer can execute the firmware detection method for the recoverable fault provided in the aforementioned method embodiments. The method includes: a BIOS acquires target fault information stored in a fault register, and transmits the target fault information to a BMC; the BMC parses the target fault information when receiving the target fault information transmitted by the BIOS, and determines a fault type of the target fault information; the BMC controls a virtual external device to transmit a target heartbeat request to a server operating system according to a preset transmission period when the fault type of the target fault information is a recoverable fault, and receives response data fed back by the server operating system based on the target heartbeat request; the BMC determines that the server operating system has a crash if detecting that the response data fed back by the operating system is interrupted within a preset time period after the BMC transmits the target heartbeat request to the server operating system, and determines a faulty component in the server according to the target fault information, where the target fault information is generated when a fault occurs in a server memory or in a PCIe device; and the virtual external device is a USB device virtualized by the BMC.

In yet another aspect, the present application also provides a non-volatile computer-readable storage medium having computer-readable instructions stored therein, where the computer-readable instructions, when executed by a processor, implement the aforementioned firmware detection method for the recoverable fault.

The method includes: a BIOS acquires target fault information stored in a fault register, and transmits the target fault information to a BMC; the BMC parses the target fault information when receiving the target fault information transmitted by the BIOS, and determines a fault type of the target fault information; the BMC controls a virtual external device to transmit a target heartbeat request to a server operating system according to a preset transmission period when the fault type of the target fault information is a recoverable fault, and receives response data fed back by the server operating system based on the target heartbeat request; the BMC determines that the server operating system has a crash if detecting that the response data fed back by the operating system is interrupted within a preset time period after the BMC transmits the target heartbeat request to the server operating system, and determines a faulty component in the server according to the target fault information, where the target fault information is generated when a fault occurs in a server memory or in a PCIe device; and the virtual external device is a universal serial bus (USB) device virtualized by the BMC.

The apparatus embodiments described above are merely schematic. Units described as separate components may or may not be physically separated, and components displayed as the units may or may not be physical units, namely, may be located in one position, or may be distributed on a plurality of network units. Some or all of the modules may be selected according to actual needs to achieve the purposes of the solutions of the embodiments. The solutions can be understood and implemented by the ordinary skilled in the art without creative labor.

Through the specific description of the embodiments, those skilled in the art can clearly know that each embodiment can be implemented by virtue of software with necessary universal hardware platform, and of course, can also be implemented by virtue of hardware. Based on this understanding, the above technical solutions or the part contributing to the prior art can be essentially embodied in a form of software products. The computer software product can be stored in computer readable storage media, such as ROM, magnetic discs, compact discs, etc., including a plurality of instructions for making a computer device (which may be a personal computer, a server, or a network device, etc.) execute the methods described in each embodiment or some parts of the embodiment.

Finally, it should be noted that the above embodiments are only used for illustrating the technical solutions of the present application rather than limiting the present application. Although the present application is described in detail with reference to the foregoing embodiments, it should be understood by those ordinary skilled in the art that the technical solutions described in the foregoing embodiments may be modified or some technical features may be equivalently substituted. However, these modifications or substitutions do not make the essence of the corresponding technical solutions depart from the scope of the technical solutions of various embodiments of the present application.

What is claimed is:

1. A firmware detection system for a recoverable fault, comprising a basic input/output system (BIOS), a server operating system, a fault register configured in a central processing unit (CPU), a baseboard management controller (BMC), a memory, and a peripheral component interconnect express (PCIe) device, wherein the BIOS is configured to acquire target fault information stored in the fault register, and transmit the target fault information to the BMC;

the BMC is configured to parse the target fault information when receiving the target fault information transmitted by the BIOS, and determine a fault type of the target fault information;

the BMC is further configured to control a virtual external device to transmit a target heartbeat request to the server operating system according to a preset transmission period when the fault type of the target fault information is a recoverable fault, and receive response data fed back by the server operating system based on the target heartbeat request; and the BMC is further configured to determine that the server operating system has a crash when if detecting that the response data fed back by the server operating system is interrupted within a preset time period after the virtual external device transmits the target heartbeat request to the server operating system, and determine a faulty component in a server according to the target fault information, wherein the target fault information is generated when a fault occurs in the memory of the server and in the PCIe device; and the virtual external device is a universal serial bus (USB) device virtualized by the BMC.

2. The system according to claim 1, wherein the fault register comprises an uncorrected error status (UNCERRSTS) register, a device status (DEVSTS) register, and a STATUS register; and the BIOS is configured to detect at least one of fault information generated in the DEVSTS register, the fault information generated in the STATUS register, or the fault information generated in the UNCERRSTS register according to a preset detection period.

3. The system according to claim 2, wherein the target fault information is generated when the fault occurs in the memory; and the BMC is configured to parse the target fault information, and determine that the fault type of the target fault information is the recoverable fault when a field comprised in the target fault information satisfies a first preset rule; otherwise, determine that the fault type of the target fault information is an unrecoverable fault, wherein the first preset rule is configured for determining whether the target fault information comprises a preset field.

4. The system according to claim 3, wherein the BMC is configured to parse the target fault information, and determine that the fault type of the target fault information is the recoverable fault when the target fault information indicates that the STATUS register records a fault, and the target fault information comprises the preset field.

5. The system according to claim 2, wherein the target fault information is generated when the fault occurs in the PCIe device; and the BMC is configured to parse the target fault information, and determine that the fault type of the target fault information is the recoverable fault when a field comprised in the target fault information satisfies a second preset rule.

6. The system according to claim 5, wherein the BMC is configured to determine that the fault type of the target fault information is the recoverable fault when the target fault information indicates that the UNCERRSTS register records an unrecoverable fault, and the DEVSTS register records a non-fatal fault.

7. The system according to claim 1, further comprising a platform controller hub (PCH), wherein the BMC is configured to control the virtual external device to transmit the target heartbeat request to the PCH according to the preset transmission period, and receive the response data fed back by the PCH based on the target heartbeat request.

8. The system according to claim 1, wherein the target heartbeat request is an HID_GET_REPORT request constructed by employing a bmRequest field;

the BMC is configured to execute an initialization operation, and create a crash-status detection task process after completing the initialization operation; the initialization operation comprises initializing a library function and configuring a system clock;

the BMC is further configured to execute the crash-status detection task process, call a USBD_LL_SetupStage function to handle a setup phase of the virtual external device, call a USBD_LL_DataInStage function to handle an IN phase of the virtual external device, and call a USBD_LL_DataOutStage function to handle an OUT phase of the virtual external device;

the BMC is further configured to construct parameters of the HID_GET_REPORT request when determining that the virtual external device is successfully configured;

the BMC is further configured to call a usb_control_msg function to transmit the HID_GET_REPORT request after completing construction of the HID_GET_REPORT request; and the BMC is further configured to call a USBD_HID_GetReport function in a peripheral interruption handling function to receive the response data fed back by the server operating system based on the target heartbeat request.

9. The system according to claim 1, wherein the BMC is configured to parse the target fault information when determining that the server operating system has the crash, determine the faulty component, and record a current crash event and the faulty component into a system environment log (SEL) to prompt a user about the faulty component.

10. A firmware detection method for a recoverable fault, being applied to a firmware detection system for a recoverable fault, wherein the firmware detection system comprises a basic input/output system (BIOS), a server operating system, a fault register configured in a central processing unit (CPU), a baseboard management controller (BMC), a memory, and a peripheral component interconnect express (PCIe) device; and the method comprising:

the BIOS acquires target fault information stored in the fault register, and transmits the target fault information to the BMC, the BMC parses the target fault information when receiving the target fault information transmitted by the BIOS, and determines a fault type of the target fault information, the BMC controls a virtual external device to transmit a target heartbeat request to the server operating system according to a preset transmission period when the fault type of the target fault information is a recoverable fault, and receives response data fed back by the server operating system based on the target heartbeat request, and the BMC determines that the server operating system has a crash when detecting that the response data fed back by the server operating system is interrupted within a preset time period after the virtual external device transmits the target heartbeat request to the server operating system, and determines a faulty component in a server according to the target fault information, wherein the target fault information is generated when a fault occurs in the memory of the server and in the PCIe device; and the virtual external device is a universal serial bus (USB) device virtualized by the BMC.

11. The method according to claim 10, wherein the fault register comprises an uncorrected error status (UNCERRSTS) register, a device status (DEVSTS) register, and a STATUS register; and the BIOS acquires target fault information stored in the fault register, comprises:

the BIOS detects at least one of fault information generated in the DEVSTS register, the fault information generated in the STATUS register, or the fault information generated in the UNCERRSTS register according to a preset detection period.

12. The method according to claim 11, wherein the target fault information is generated when the fault occurs in the memory; and the BMC parses the target fault information when receiving the target fault information transmitted by the BIOS, and determines a fault type of the target fault information, comprises:

the BMC parses the target fault information, and determines that the fault type of the target fault information is the recoverable fault when a field comprised in the target fault information satisfies a first preset rule; otherwise, determines that the fault type of the target fault information is an unrecoverable fault.

13. The method according to claim 12, wherein the BMC parses the target fault information, and determines that the fault type of the target fault information is the recoverable fault when a field comprised in the target fault information satisfies a first preset rule, comprises:

the BMC parses the target fault information, and determines that the fault type of the target fault information is the recoverable fault when the target fault information indicates that the STATUS register records a fault, and the target fault information comprises a preset field.

14. The method according to claim 11, wherein the target fault information is generated when the fault occurs in the PCIe device; and the BMC parses the target fault information when receiving the target fault information transmitted by the BIOS, and determines a fault type of the target fault information, comprises:

the BMC parses the target fault information, and determines that the fault type of the target fault information is the recoverable fault when a field comprised in the target fault information satisfies a second preset rule.

15. The method according to claim 14, wherein the BMC determines that the fault type of the target fault information is the recoverable fault when a field comprised in the target fault information satisfies a second preset rule comprises:

the BMC determines that the fault type of the target fault information is the recoverable fault when the UNCERRSTS register records an unrecoverable fault, and the DEVSTS register records a non-fatal fault.

16. The method according to claim 10, wherein the firmware detection system further comprises a platform controller hub (PCH); and the BMC controls a virtual external device to transmit a target heartbeat request to the server operating system according to a preset transmission period, and receives response data fed back by the server operating system based on the target heartbeat request, comprises:

the BMC controls the virtual external device to transmit the target heartbeat request to the PCH according to the preset transmission period, and receives the response data fed back by the PCH based on the target heartbeat request.

17. The method according to claim 10, wherein the target heartbeat request is an HID_GET_REPORT request constructed by employing a bmRequest field;

the BMC controls a virtual external device to transmit a target heartbeat request to the server operating system according to a preset transmission period, comprises:

the BMC executes an initialization operation, and creates a crash-status detection task process after completing the initialization operation, wherein the initialization operation comprises initializing a library function, and configuring a system clock;

the BMC executes the crash-status detection task process, calls a USBD_LL_SetupStage function to handle a setup phase of the virtual external device, calls a USBD_LL_DataInStage function to handle an IN phase of the virtual external device, and calls a USBD_LL_DataOutStage function to handle an OUT phase of the virtual external device;

the BMC constructs parameters of the HID_GET_REPORT request when determining that the virtual external device is successfully configured;

the BMC calls a usb_control_msg function to transmit the HID_GET_REPORT request after completing construction of the HID_GET_REPORT request; and the BMC calls a USBD_HID_GetReport function in a peripheral interruption handling function to receive the response data fed back by the server operating system based on the target heartbeat request.

18. The method according to claim 10, wherein the BMC determines a faulty component in a server according to the target fault information, comprises:

the BMC parses the target fault information when determining that the server operating system has the crash, determines the faulty component, and records a current crash event and the faulty component into a system environment log (SEL) to prompt a user about the faulty component.

19. A server, having the firmware detection system for the recoverable fault according to claim 1 provided therein.

20. A non-transitory computer-readable storage medium, having computer programs stored therein, wherein the computer programs, when executed by a processor, implement steps of a firmware detection method for a recoverable fault, being applied to a firmware detection system for a recoverable fault, wherein the firmware detection system comprises a basic input/output system (BIOS), a server operating system, a fault register configured in a central processing unit (CPU), a baseboard management controller (BMC), a memory, and a peripheral component interconnect express (PCIe) device; and the method comprising:

the BIOS acquires target fault information stored in the fault register, and transmits the target fault information to the BMC, the BMC parses the target fault information when receiving the target fault information transmitted by the BIOS, and determines a fault type of the target fault information, the BMC controls a virtual external device to transmit a target heartbeat request to the server operating system according to a preset transmission period when the fault type of the target fault information is a recoverable fault, and receives response data fed back by the server operating system based on the target heartbeat request, and the BMC determines that the server operating system has a crash when detecting that the response data fed back by the server operating system is interrupted within a preset time period after the virtual external device transmits the target heartbeat request to the server operating system, and determines a faulty component in a server according to the target fault information, wherein the target fault information is generated when a fault occurs in the memory of the server and in the PCIe device; and the virtual external device is a universal serial bus (USB) device virtualized by the BMC.

* * * * *